C. H. MILLER.
CIRCUIT BREAKER.
APPLICATION FILED APR. 17, 1906.
1,112,639.
Patented Oct. 6, 1914.
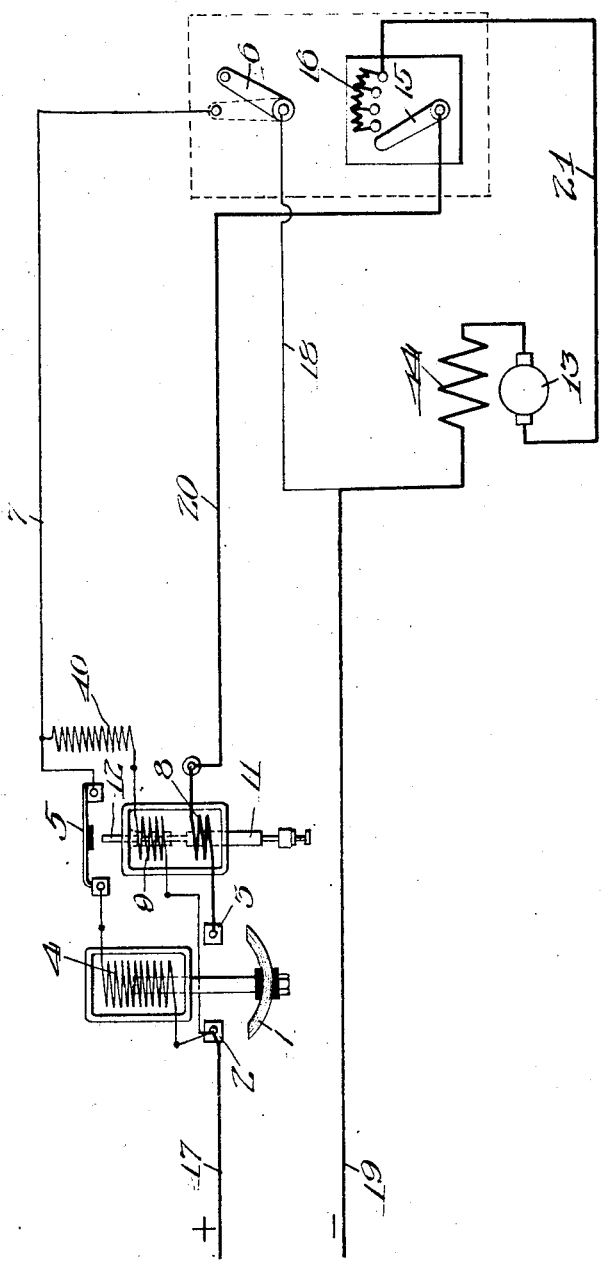

UNITED STATES PATENT OFFICE.

CHARLES H. MILLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

CIRCUIT-BREAKER.

1,112,639.  Specification of Letters Patent.  Patented Oct. 6, 1914.

Continuation of application Serial No. 262,407, filed May 26, 1905. This application filed April 17, 1906. Serial No. 312,179.

*To all whom it may concern:*

Be it known that I, CHARLES H. MILLER, a citizen of the United States, residing at Milwaukee, in the county of Milwaukee and State of Wisconsin, have invented new and useful Improvements in Circuit-Breakers, of which the following is a full, clear, concise, and exact description, reference being had to the accompanying drawing, forming a part of this specification.

My invention relates to improvements in circuit breakers.

The particular form of breaker to which my invention especially applies is preferably provided with an electro-magnetic winding, which serves to set the breaker and then keep it closed while normal conditions prevail.

According to the preferred form of my invention, I provide an overload switch which controls the circuit of the setting winding. The overload switch is preferably provided with an actuating winding and a maintaining winding. In order to set or close the circuit breaker, I close the circuit of the setting winding. When an overload occurs, the actuating winding preferably opens the overload switch. The setting winding is thus deënergized, and, in consequence, the breaker is opened. The retaining winding serves to keep the overload switch open so that the breaker cannot be reset or closed while an overload exists. In order to place the circuit breakers in condition to be reset after the conditions become normal, I cause the retaining magnet to be deënergized so that the overload switch will be closed.

It will, of course, be understood that the ways and means which I particularly set forth for carrying out the preferred form of my invention, may be changed without departing from what I claim as new. Furthermore, it will be understood that certain features of my invention may be used in various relations.

So far as certain features of my invention are concerned, the present application is a continuation of my application which was filed May 26, 1905, Serial No. 262,407.

In order to explain my invention, I have assumed the apparatus which is illustrated in the accompanying drawing.

The circuit breaker is preferably provided with a solenoid or other switch, which is provided with a movable contact 1 adapted to engage stationary contacts 2 and 3. It will be understood that instead of the solenoid switch, the breaker may be provided with other means which will serve the purpose. The movable contact is preferably adapted to be brought into engagement with the stationary contacts by means of a setting electro-magnetic winding 4. The circuit of the setting winding is preferably controlled by an overload switch 5 and a pilot switch 6, which are preferably connected by a conductor 7. The setting winding is preferably arranged across the circuit which the breaker controls. It will be understood that the overload switch may be arranged in circuit in various ways to control the energization of the setting winding. For the purpose of operating the overload switch, I preferably provide an actuating winding or overload coil 8 and a retaining or maintaining winding 9. The actuating winding is preferably arranged in circuit in series with the main switch contact. The retaining winding is preferably arranged in circuit in parallel with the overload switch 5 and the setting winding 4. Inasmuch as it is some times impractical to make the retaining winding 9 of sufficiently high resistance, I preferably place a resistance 10 in series therewith. The actuating winding 8 and the retaining winding 9 are preferably adapted to attract a plunger 11 which carries a pin 12. When the plunger is elevated the pin 12 engages the over-load switch to open the same.

In order to explain the operation of my invention, I have shown the circuit breaker as arranged in circuit with a motor and a motor controller. The motor may be provided with an armature 13 and a field 14. The motor controller may be provided with a contact arm 15 adapted to vary a resistance 16. The circuit breaker may be arranged at any suitable place in the circuit which is to be controlled. The pilot switch may be arranged at any distant point from the circuit breaker. In practice, the pilot switch and the motor controller may be arranged upon the same switch board, the motor and the circuit breaker being arranged at other places. Inasmuch as I require merely one conductor between the pilot switch and the breaker, I facilitate the arrangement of the pilot switch at a distant point from the breaker.

In order to set the circuit breaker, I close the pilot switch. The circuit which will thus be closed extends from the positive line 17 through contact 2, winding 4, overload switch 5, conductor 7, pilot switch 6 and conductor 18 to negative line 19. I thus energize the setting winding 4, and, in consequence, the movable contact 1 will be brought into engagement with the stationary contacts 2 and 3, thereby setting or closing the circuit breaker. If the motor controller be actuated to start the motor, the motor circuit will be closed from the positive line 17 through contacts 2, 1 and 3, overload coil 8, conductor 20, arm 15, resistance 16, conductor 21, armature 13 and field 14 to the negative line 19.

Whenever an overload occurs, the actuating winding or overload coil 8 will respond, thereby raising the plunger 11 to open the overload switch 5. The setting winding will thus be deënergized, and, in consequence, the main contact 1 will leave the stationary contacts 2 and 3, thereby opening the circuit breaker to protect the circuit and the motor. It will be noted that the retaining winding 9 is connected between the stationary contact 2 and the conductor 7 in parallel with the overload switch 5. It will therefore remain energized, thereby keeping the overload switch open.

In order to place the circuit breaker in condition to be reset, I open the pilot switch 6. Inasmuch as I thus deënergize the retaining winding 9, the plunger 11 will be released, and, in consequence, the overload switch 5 will be closed.

If an attempt be made to set the breaker while an overload exists, the overload coil will instantly open the overload switch, thereby deënergizing the setting winding. The retaining winding will then keep the overload switch open so long as said winding is energized.

It will be understood that my circuit breaker may be arranged in circuit in different relations and that it may be used with various apparatus. Furthermore, it will be understood that changes may be made in the illustrative device shown in the drawing without in any way departing from my invention as defined by the claims appended hereto.

Having thus described my invention what I claim as new and desire to secure by Letters Patent is:

1. In a circuit breaker, in combination, an electroresponsive switch, an electroresponsive device responsive to overloads to deënergize said switch, said device tending to automatically return to normal position upon cessation of overloads to again energize said switch and means insuring against the automatic return of said device.

2. In combination, a circuit controller having an overload winding for effecting operation thereof, said controller after operation tending to automatically return to normal position, and manually controlled electrical means preventing such automatic return of said controller.

3. In a circuit breaker, in combination, an electroresponsive switch, an overload device responsive to deënergize said switch and tending to automatically move to again energize said switch upon cessation of overloads, a manual control switch and means insuring against said automatic movement of said overload device and necessitating operation of said control switch to reset said electroresponsive switch.

4. In combination, an electroresponsive circuit controller, an overload device controlling the same, said device having an operating winding responsive to overloads and a retaining winding effective after cessation of overloads, and common means for controlling at will said electroresponsive circuit controller and for deënergizing said retaining winding.

5. In a circuit breaker, in combination, a winding for setting said breaker, an overload magnet having an overload coil and retaining means effective after cessation of overloads, means adapted to be actuated by said magnet to open said breaker, and means adapted to control said breaker from a distant point at will.

6. In combination, an electromagnetically operated switch, an electromagnetically operated and retained overload device for deënergizing said switch, and a controlling switch, said overload device, when responding, being adapted to maintain said electromagnetically operated switch deënergized until said controlling switch is operated.

7. In a circuit breaker, in combination, a winding for setting said breaker, an overload switch for controlling the energization of said winding, an overload coil for actuating said switch to deënergize said winding, a winding for preventing said overload switch from being returned to its normal position and a manually operated means for controlling said last mentioned winding.

8. In a circuit breaker, in combination, a winding for setting said breaker, an overload switch for controlling the energization of said winding, an overload coil for actuating said switch to deënergize said winding, a winding for preventing said switch from being returned to its initial position, and a switch for controlling the circuit of said setting winding and said last mentioned winding.

9. In a circuit breaker, in combination, a winding for setting said circuit breaker and maintaining the same closed, an overload switch for controlling the energization of said winding, an overload coil for actuating said overload switch to deënergize said winding, and a retaining winding for said overload switch energized independently of the circuit breaker.

10. In a circuit breaker, in combination, a winding for setting said circuit breaker, an overload switch for controlling the energization of said winding, an overload coil for actuating said overload switch to deënergize said winding, a retaining magnet for said overload switch energized independently of the circuit breaker, and a switch for controlling the circuit of said setting winding.

11. In a circuit breaker, a winding for setting said circuit breaker and maintaining the same closed, an overload switch for controlling the energization of said winding, an overload coil for actuating said switch to deënergize said winding, a retaining winding for holding said overload switch after it is actuated by said overload coil, said retaining winding being arranged in circuit in parallel with said overload switch.

12. In a circuit breaker, a winding for setting said circuit breaker, an overload switch for controlling the energization of said winding, an overload coil for actuating said switch to deënergize said winding, a retaining winding for holding said overload switch after it is actuated by said overload coil, said retaining winding being arranged in circuit in parallel with said overload switch, and a switch for controlling the circuit of said setting winding.

13. In a circuit breaker, in combination, a winding for setting the same, an overload switch arranged in circuit of said winding, an overload coil for opening said overload switch to open the breaker, a retaining winding adapted to keep said overload switch open and arranged in circuit in parallel with said overload switch, and a pilot switch for controlling the circuit of both said setting winding and said retaining winding.

14. In a circuit breaker, in combination, a winding adapted to set said breaker and arranged across the line, an overload switch arranged in the circuit of said winding, an overload coil adapted to open said switch, and a winding adapted to hold said overload switch after it is opened and arranged in circuit in parallel with said setting winding.

15. In a circuit breaker, in combination, a winding adapted to set said breaker and arranged across the line, an overload switch arranged in the circuit of said winding, an overload coil adapted to open said switch, a retaining winding adapted to hold said overload switch after it is opened and arranged in circuit in parallel with said setting winding, and a pilot switch for controlling the circuit of both said setting winding and said retaining winding.

16. In a circuit breaker, an electro-magnetic winding for setting the same, an overload magnet having an overload coil and a retaining winding effective after cessation of overloads, means arranged to control the energization of said setting winding and adapted to be actuated by said overload magnet, and means for controlling said first mentioned winding at will from a distant point.

17. In combination, a switch, a winding adapted to close said switch, an overload magnet having an overload coil and a retaining winding effective after cessation of overloads, and means adapted to be actuated by said magnet to open said switch, and means for controlling said switch at will from a distant point.

18. In combination, an electroresponsive switch, an overload device for deënergizing said switch, said overload device having an actuating coil and a retaining coil, the latter coil retaining said device in the position to which it is moved by the former coil and a single pole switch for controlling said electroresponsive switch and said retaining coil to energize and deënergize said electroresponsive switch at will.

19. In a circuit breaker, in combination, a main switch, an electro-magnetic winding adapted to close said switch, an overload switch controlling the circuit of said winding, an overload magnet provided with an overload coil and a retaining winding and adapted to actuate said overload switch, said retaining winding being arranged in parallel with said overload switch, and means for controlling at will the circuits of both said setting winding and said retaining winding.

20. The combination with a solenoid switch, of an overload magnet controlling the circuit through the winding thereof, comprising a winding adapted to be operatively energized by an excessive flow of current, a plunger operated by said winding, and means controllable at will for retaining said plunger in a raised position for an indefinite period after it has once been raised by said overload winding.

21. The combination with a solenoid switch, of a switch controlling the circuit through the winding thereof, an overload magnet for operating said switch, comprising a winding adapted to be operatively energized by an excessive flow of current, a plunger operated by said winding, and a second winding controllable at will for retaining said plunger in its raised position for an indefinite period when it has once been raised by said overload winding.

22. The combination with a solenoid switch, of means for opening and closing the circuit through the winding thereof, an overload magnet controlling the circuit through the winding of said switch comprising a winding adapted to be operatively energized by an excessive flow of current, a plunger operated by said winding, and manually controlled means for retaining said plunger in its raised position.

23. The combination with a solenoid switch, of means for opening and closing the circuit through the winding thereof, a second switch for controlling the circuit through the winding of said solenoid switch, an overload magnet for operating said switch comprising a winding adapted to be operatively energized by an excessive flow of current, a plunger operated by said winding, a second winding for retaining said plunger in its raised position until said means for opening and closing the circuit through the winding of said solenoid switch has been operated to open the circuit therethrough.

24. The combination with a solenoid switch, of an overload magnet for controlling the circuit therethrough, comprising a winding adapted to be operatively energized by an excessive flow of current, a plunger operated by said winding, and a second winding for retaining said plunger in its raised position when it has been raised by said overload winding, and means for opening and closing the circuit through said retaining winding, and through the winding of said solenoid switch.

25. The combination with a solenoid switch, of an overload magnet for controlling the circuit through the winding thereof, comprising a winding adapted to be operatively energized by an excessive flow of current, a plunger operated by said winding, a second winding for retaining said plunger in its raised position when it has been raised by said overload winding, and means for controlling the circuit through said retaining winding.

In witness whereof, I have hereunto subscribed my name in the presence of two witnesses.

CHARLES H. MILLER.

Witnesses:
HENRY J. WIEGAND,
WALTER E. SARGENT.